United States Patent
MacDonald

(10) Patent No.: US 9,746,001 B2
(45) Date of Patent: Aug. 29, 2017

(54) VOLUMETRIC RESISTANCE BLOWER APPARATUS AND SYSTEM

(75) Inventor: Mark MacDonald, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 130 days.

(21) Appl. No.: 13/977,484

(22) PCT Filed: Dec. 7, 2011

(86) PCT No.: PCT/US2011/063828
§ 371 (c)(1),
(2), (4) Date: Jun. 28, 2013

(87) PCT Pub. No.: WO2013/085510
PCT Pub. Date: Jun. 13, 2013

(65) Prior Publication Data
US 2013/0286581 A1    Oct. 31, 2013

(51) Int. Cl.
F04D 29/66    (2006.01)
G06F 1/20    (2006.01)

(52) U.S. Cl.
CPC .......... F04D 29/666 (2013.01); G06F 1/20 (2013.01)

(58) Field of Classification Search
USPC .................................... 361/679.48
See application file for complete search history.

(56) References Cited

U.S. PATENT DOCUMENTS

| | | | |
|---|---|---|---|
| 4,563,126 A | 1/1986 | Kobayashi et al. | |
| 5,297,942 A * | 3/1994 | Fleishman et al. | 417/354 |
| 2003/0161102 A1* | 8/2003 | Lee et al. | 361/687 |
| 2004/0184914 A1 | 9/2004 | Doege et al. | |
| 2009/0120454 A1* | 5/2009 | Ochs et al. | 132/325 |
| 2010/0172095 A1 | 7/2010 | MacDonald et al. | |
| 2011/0063795 A1 | 3/2011 | Yeh et al. | |
| 2011/0159797 A1 | 6/2011 | Beltman et al. | |

FOREIGN PATENT DOCUMENTS

| | | |
|---|---|---|
| JP | S61-048999 | 4/1986 |
| JP | H10-54388 | 2/1998 |
| JP | 2001082396 | 3/2001 |
| JP | 2003-218568 | 7/2003 |
| JP | 2006-207519 | 8/2006 |
| JP | 2006299949 | 11/2006 |

OTHER PUBLICATIONS

International Search Report and Written Opinion, Mailed Date: Jul. 24, 2012, Application No. PCT/US2011/063828, Filed Date: Dec. 7, 2011, pp. 10.

(Continued)

*Primary Examiner* — Tuan T Dinh
*Assistant Examiner* — Mukund G Patel

(57) ABSTRACT

Some embodiments of an apparatus and system are described for a volumetric resistance blower. An apparatus may comprise a motor, a rotor comprising a cylindrical foam block, and a casing having one or more inlets arranged in an axial direction of the rotor and one or more outlets arranged in a radial direction of the rotor. Other embodiments are described.

21 Claims, 10 Drawing Sheets

(56) References Cited

OTHER PUBLICATIONS

Office Action received for Japanese Patent Application No. 2014-545865, mailed Apr. 28, 2015, 3 pages including 2 pages English translation.
Office Action and Search Report received for Chinese Patent Application No. 201180075352.8, mailed Sep. 27, 2016, 12 pages (untranslated).
Office Action received for Korean Patent Application No. 2014-7015162, mailed Feb. 3, 2016, 10 pages including 4 pages English translation.

* cited by examiner

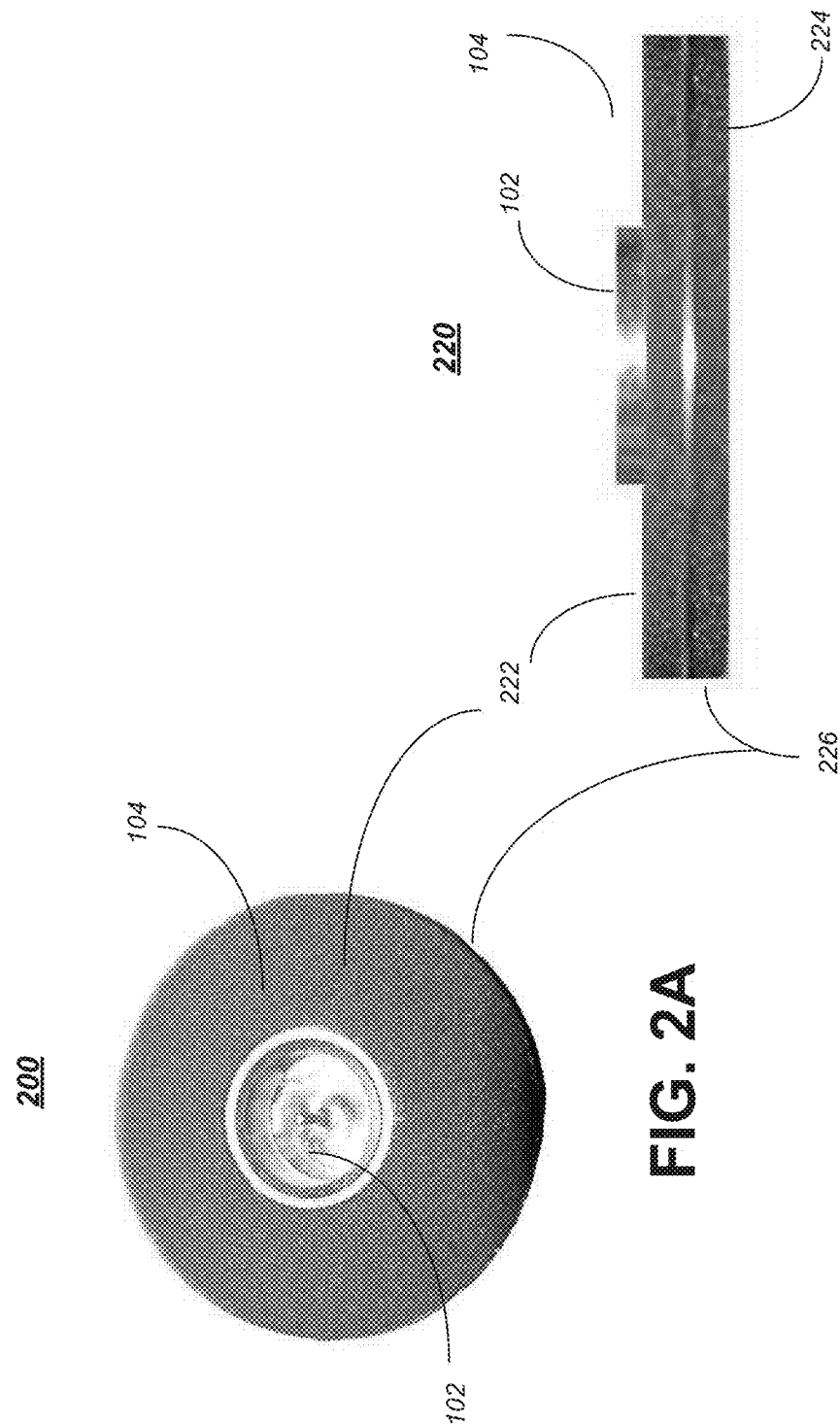

VOLUMETRIC RESISTANCE BLOWER APPARATUS AND SYSTEM

BACKGROUND

Modern computing systems generate heat during operation. The heat may affect certain platform components of a system, and is therefore generally required to be dissipated or removed from the system. Heat generated by the computing system may be limited or reduced using various thermal management techniques and/or heat dissipation techniques. For example, heat generated by a processor may be dissipated by creating a flow of air using a fan or blower. Further, various platform-level cooling devices may be implemented in conjunction with the fan or blower to enhance heat dissipation, such as heat pipes, heat spreaders, heat sinks, vents, phase change materials or liquid-based coolants.

Traditional blowers used in portable computing systems may generate flows of air to remove or dissipate heat, but they also generate high levels of noise. This may be problematic in notebook computers, for example, because ergonomic acoustic limits may be low to ensure a satisfactory user experience. Because of the ergonomic acoustic limits and other restrictions, the cooling capacity of traditional systems may be thermally limited because standard blowers may not be allowed to run at their maximum speed, resulting in reduced efficiency for the blower and reduced cooling capacity for the system. Consequently, a need exists for improved cooling techniques for notebook computers.

BRIEF DESCRIPTION OF THE DRAWINGS

FIG. 2A illustrates one embodiment of a fourth apparatus.
FIG. 2B illustrates one embodiment of a fifth apparatus.

DETAILED DESCRIPTION

Figure 1A:
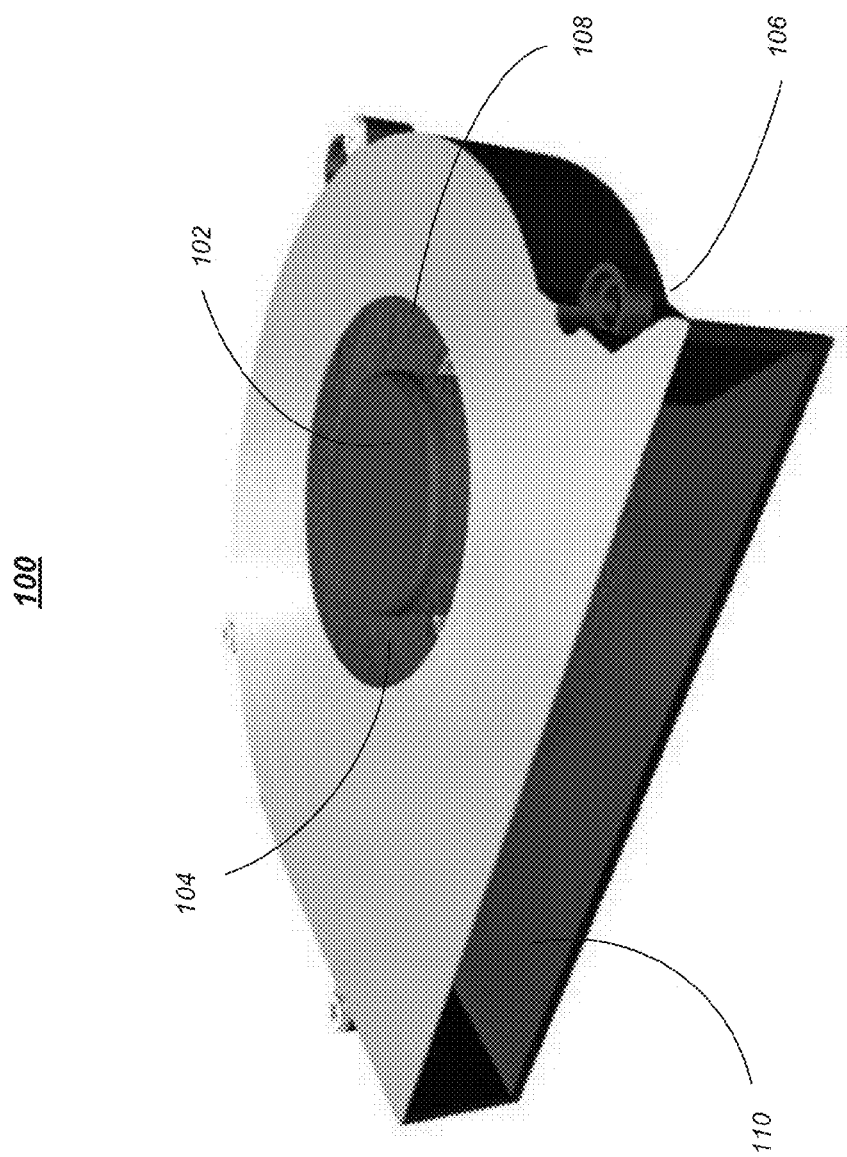
FIG. 1A illustrates one embodiment of a first apparatus.

The embodiments are generally directed to techniques designed to improve cooling in computing systems. Various embodiments provide techniques that include a volumetric resistance blower that includes a cylindrical rotor comprising or having foam material or one or more cylindrical foam blocks. Replacing a traditional blade-based rotor with a cylindrical rotor comprising or having foam material or one or more cylindrical foam blocks in a volumetric resistance blower may reduce blower acoustic levels at a given airflow allowing for improved platform thermal performance under all workloads, improved cooling capabilities, increased system performance and improved acoustics. Other embodiments are described and claimed.

In various embodiments, traditional computing system blowers include a rotor having a plurality of fins or blades. These blade-based rotors, while capable of moving air, generate an undesirable amount of noise. Because of the amount of noise generated, system designers are often required to limit the speed at which traditional blowers are allowed to operate. For example, traditional blowers are often restricted from operating at their maximum speed because the noise generated by the blade-based rotors at this and other high speeds exceeds an established ergonomic acoustic limit (e.g., an allowable amount of noise generated by the system). As a result, other measures are often taken by the system to preventing overheating, such as processor throttling, which may be equally undesirable. Consequently, a need exists for improved techniques for computing system cooling.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

In various embodiments, the rotor described herein may comprise a cylindrical rotor comprising or having foam material or one or more cylindrical foam blocks. While some embodiments refer to a cylindrical foam block rotor, it should be understood that the rotor may comprise or include support materials, dividers, or one or more pieces of foam or other suitable porous material and still fall within the described embodiments. Reference is made herein to a cylindrical foam block rotor for purposes of illustration and not limitation. As such, the embodiments are not limited in this respect.

FIG. 1A illustrates an apparatus 100. Apparatus 100 may comprise a volumetric resistance blower (VRB) 100 in some embodiments. As shown in FIG. 1A, VRB 100 may include a plurality of components, such as motor or hub 102, rotor 104, casing 106, inlet 108 and outlet 110. The embodiments are not limited to the number, type or arrangement of components shown in FIG. 1A. Various embodiments described herein refer to a dual-input, single output blower as shown in FIG. 1A. The embodiments are not limited in this context. One skilled in the art will appreciate that any suitable arrangement for VRB 100 could be used and still fall within the described embodiments.

Motor and/or hub 102 may comprise any suitable electric motor, mechanically driven engine, heat engine or aerodynamically driven motor capable of rotating rotor 104 to create a flow of air in some embodiments and/or a hub or other support structure arranged to support rotor 104 and to couple the cylindrical foam block rotor 104 to the motor 102. In various embodiments, motor and/or hub 102 may comprise an AC motor, brushed DC motor or brushless DC motor. For example, motor 102 may comprise a DC motor powered by an internal or external power source of apparatus 100. The size and location of motor and/or hub 102 may be selected based on the size and performance constraints of a particular implementation of VRB 100.

Casing 106 may comprise a housing or enclosure arranged to mount or otherwise contain or stabilize a motor and/or hub 102 and rotor 104 in some embodiments. In various embodiments, casing 106 may comprise a plastic or metal component configured with one or more inlets 108 and one or more outlets 110. For example, the casing 106 may include a top inlet 108, a bottom inlet (not shown) opposite the top inlet 108 and an outlet 110. In various embodiments, the inlets 108 may be arranged in an axial direction of the rotor 104 and the outlet 110 may be arranged in a radial direction of the rotor 104. In various embodiments the casing may include more than one outlet to enable, for example, a dual outlet configuration. In some embodiments, the casing 106 may comprise a plastic component, such as an injection molded plastic component, that provides an inlet, outlet and flow management features for the VRB 100. While various embodiments described herein include a casing 106, it should be understood that some embodiments may comprise a case-less blower in which no surrounding case is used and an airflow may exit through the rotor in a full 360 degrees. Other embodiments are described and claimed.

In various embodiments, VRB 100 includes rotor 104. Rotor 104 may be arranged to increase the pressure and/or flow of air for VRB 100 in some embodiments. Rotor 104 may be any size or shape suitable for inducing the flow of air. In some embodiments, rotor 104 may comprise a cylindrical foam block rotor 104 which may comprise a cylindrical rotor comprising or having foam material or one or more cylindrical foam blocks that make up a substantial portion of the rotor. For example, multiple foam portions or portions of another suitable material may be coupled to motor and/or hub 102 in a pie configuration or multiple layers of foam or other suitable material may be coupled or layered together to form the rotor. In some embodiments, one or more different materials may be used to form the rotor 104 and still fall within the described embodiments. Cylindrical foam block rotor 104 is described in more detail with reference to FIG. 1B.

Figure 1B:
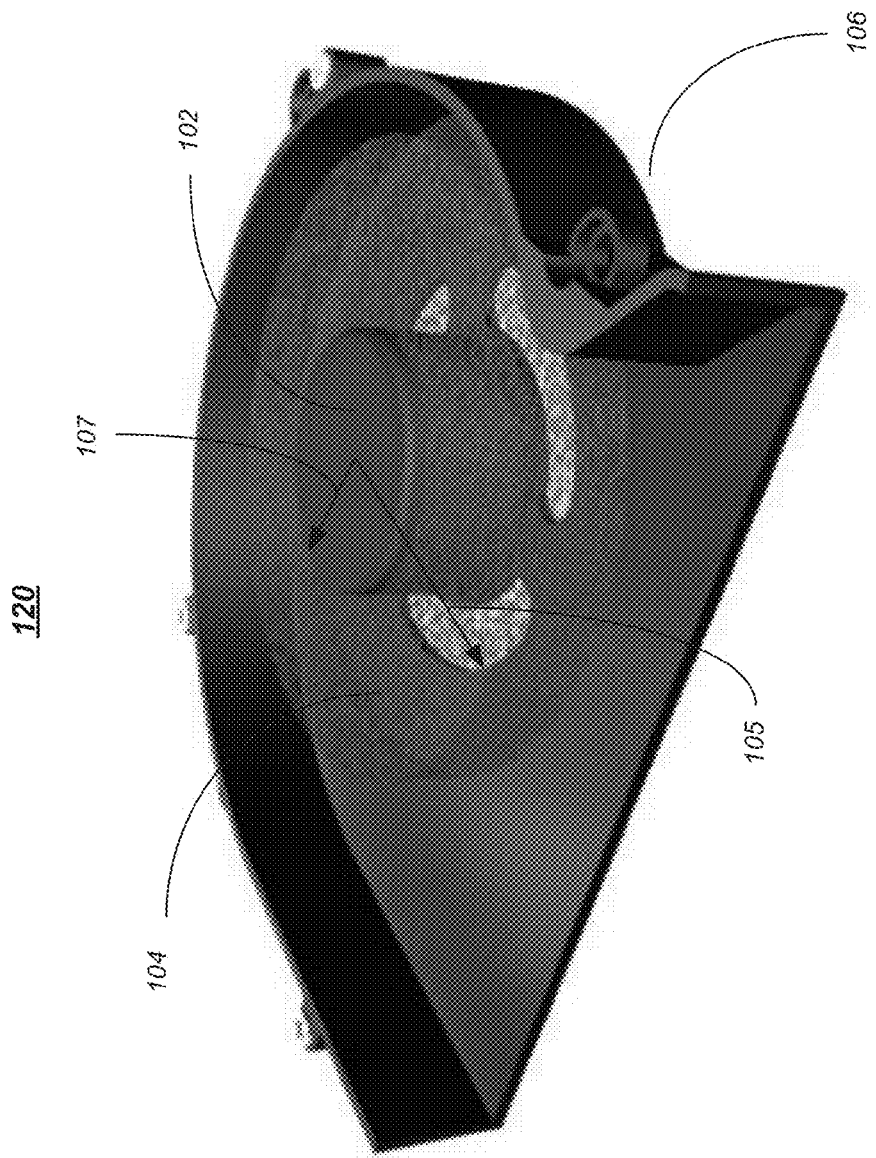
FIG. 1B illustrates one embodiment of a second apparatus.

FIG. 1B illustrates an apparatus 120 that may be the same or similar to apparatus 100 of FIG. 1A, where like elements are similarly numbered. For example, apparatus 120 may comprise a view of a VRB 120 in which a top portion of casing 106 is removed to reveal cylindrical foam block rotor 104. While referred to herein as a cylindrical foam block rotor 104, it should be understood that the rotor 104 could comprise suitable material including but not limited to foam and still fall within the described embodiments. For example, rotor 104 may comprise any suitable porous material in various embodiments. The embodiments are not limited in this context.

As shown in FIG. 1B, cylindrical foam block rotor 104 may be a circular disc that is secured to motor and/or hub 102 in some embodiments. For example, cylindrical foam block rotor 104 may include an outer radius 105 and an inner radius 107, where the outer radius comprises the perimeter of the cylindrical foam block rotor 104 and the inner radius 107 comprises an opening to accommodate and/or secure the cylindrical foam block rotor 104 to the motor and/or hub 102. In some embodiments, the inner radius 107 is selected to coincide with a radius of the motor and/or hub 102.

Figure 1C:
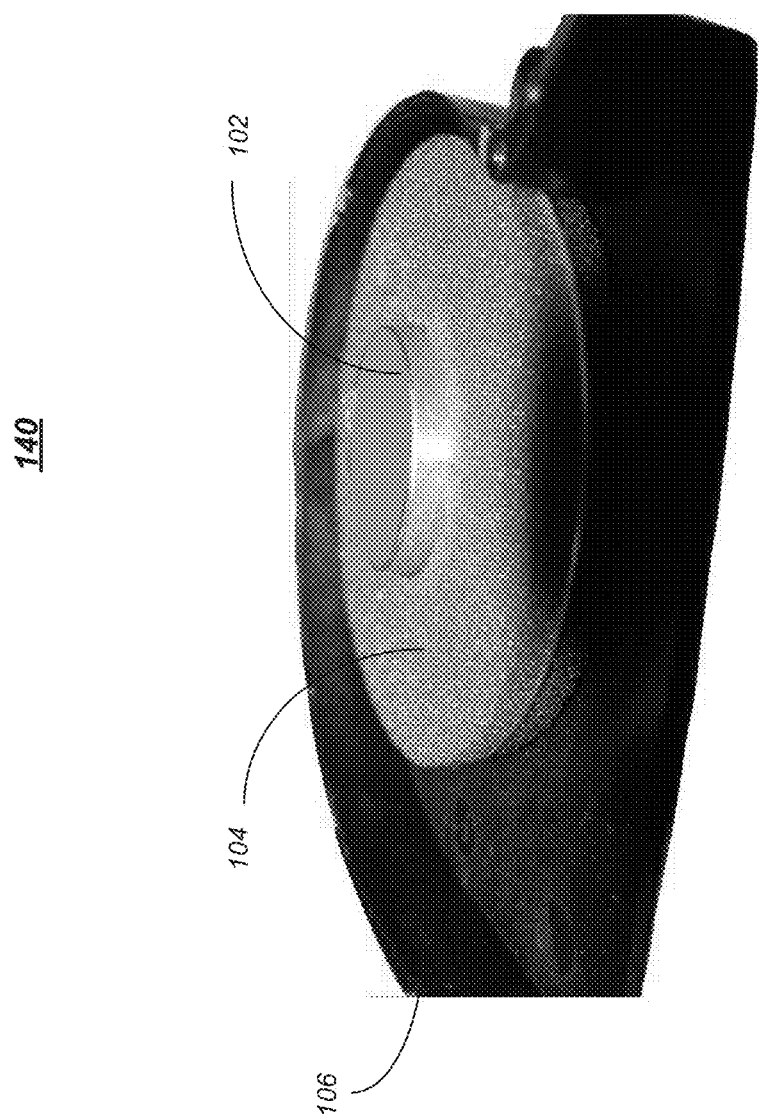
FIG. 1C illustrates one embodiment of third apparatus.

FIG. 1C illustrates an apparatus 140 that may be the same or similar to apparatus 100 of FIG. 1A and apparatus 120 of FIG. 1B, where like elements are similarly numbered. For example, apparatus 150 may comprise another view of a VRB 140 in which a top portion of casing 106 is removed to reveal cylindrical foam block rotor 104.

In some embodiments, FIG. 1C may more clearly illustrate the porosity of cylindrical foam block rotor 104. Cylindrical foam block rotor 104 may comprise or be composed of any suitable material having porosity capable of generating a flow of air in VRB 140. Porosity or void fraction may comprise a measure of the void or empty spaces in a material, and is a fraction of the volume of voids over the total volume, between 0-1, or as a percentage between 0-100%. In various embodiments, the cylindrical foam block rotor 104 may comprise a material selected to have between 10 pores per inch (ppi) and 100 ppi. Other embodiments are described and claimed.

In some embodiments, cylindrical foam block rotor 104 may comprise a solid foam material. Solid foams may comprise an important class of lightweight cellular engineering materials. In various embodiments, these foams can be classified into two types based on their pore structure: open-cell-structured foams (also known as reticulated foams) and closed-cell foams. Cylindrical foam block rotor 104 may comprise an open-cell-structured foam material in some embodiments.

In various embodiments, open-cell-structured foams contain pores that are connected to each other and form an interconnected network that is relatively soft. Open-cell foams will fill with whatever they are surrounded with in some embodiments. For example, open-cell foam may be filled with air. In various embodiments, cylindrical foam block rotor 104 may be spun by motor and/or hub 102, resulting in the cylindrical foam block rotor 104 creating a volumetric resistance inside the casing 106. In some embodiments, the volumetric resistance may to cause a flow of air to be drawn into the one or more inlets 108 and out of the outlet 110. In some embodiments, cylindrical foam block rotor 104 may be arranged to pump water or other materials. The embodiments are not limited in this respect.

The cylindrical foam block rotor 104 may be arranged to generate a centrifugal force that causes a flow of air to flow through the cylindrical foam block rotor 104 in some embodiments. For example, the open-cell-structured foam material of cylindrical foam block rotor 104 may allow for air to fill the open cells and to pass through the cylindrical foam block rotor 104 in some embodiments. Other embodiments are described and claimed.

FIG. 2A illustrates an apparatus 200 and FIG. 2B illustrations an apparatus 220 that may be the same or similar to cylindrical foam block rotor 104 of FIG. 1A, FIG. 1B and FIG. 1C, where like elements are similarly numbered. For example, apparatus 200 and apparatus 220 may comprise different views of cylindrical foam block rotor 104 in which cylindrical foam block rotor 104 has been removed from casing 106 to reveal additional details. For example, FIG. 2A may comprise a top down view and FIG. 2B may comprise a side view.

As shown in FIG. 2A, cylindrical foam block rotor 104 may comprise a circular shape having a substantially contiguous radius 226 in some embodiments. In various embodiments, the substantially contiguous radius 226 may comprise a flat or smooth edge that forms the outer perimeter of cylindrical foam block rotor 104. While shown as a substantially flat radial surface 226 in FIG. 2B, it should be understood that the edges or corners of the radial surface may be rounded or otherwise shaped to form cylindrical foam block rotor 104 and still fall within the described embodiments.

In some embodiments, as shown in FIGS. 2A and 2B, cylindrical foam block rotor 104 may comprise a substantially flat top surface 222 having no blades or fins and a substantially flat bottom surface 224 having no blades or fins. Unlike traditional blade-based rotors, cylindrical foam block rotor 104 may comprise substantially flat surfaces that produce less acoustic noise than rotors having discontinuities like blades and fins. The embodiments are not limited in this respect.

Figure 2C:
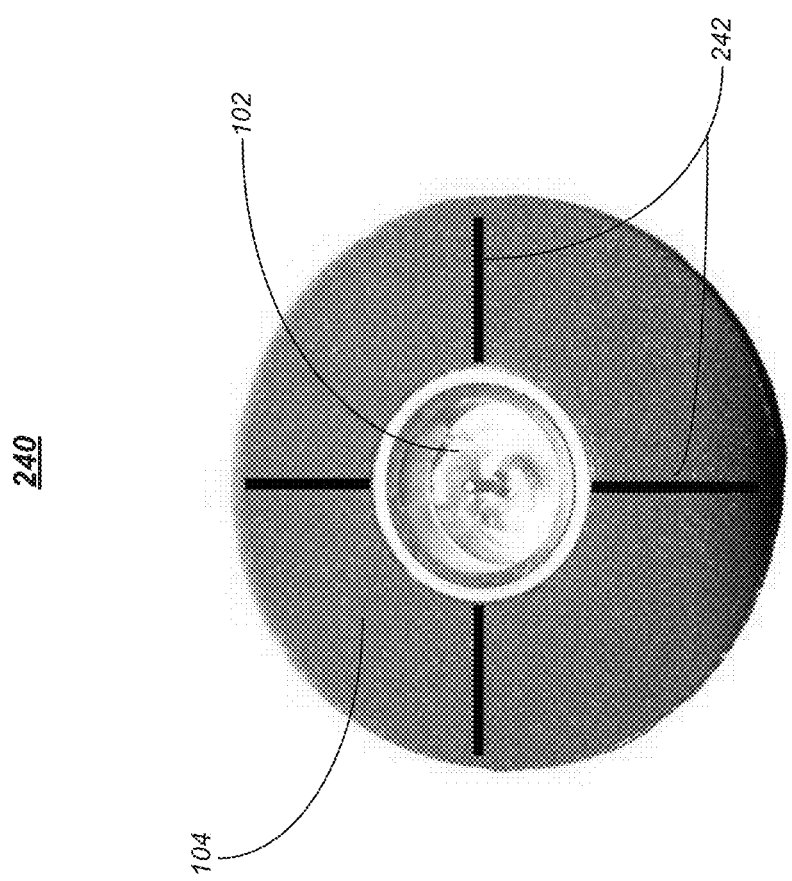
FIG. 2C illustrates one embodiment of a sixth apparatus.

FIG. 2C illustrates an apparatus 240 that may be the same or similar to cylindrical foam block rotor 104 of FIG. 1A, FIG. 1B, FIG. 1C, FIG. 2A and FIG. 2B, where like elements are similarly numbered. In some embodiments, apparatus 240 may comprise the cylindrical foam block rotor 104 having one or more internal dividers 242 arranged to prevent azimuthal circulation inside the cylindrical foam block rotor 104. In various embodiments, the porous composition of cylindrical foam block rotor 104 may allow for air to enter the pores or open cells of cylindrical foam block rotor 104 that, when spun, may result in integral circulation of the air which may result in reduced efficiencies for the cylindrical foam block rotor 104. To combat this problem, internal dividers 242 may be arranged inside cylindrical foam block rotor 104.

In some embodiments, internal dividers 242 may comprise plastic or metals arms extending from hub 102 to create chambers in the cylindrical foam block rotor 104 that reduce any azimuthal circulation. In other embodiments, internal dividers 242 may be arranged as or similar to standard rotor blades or fins. In these embodiments, the foam or other material used to form cylindrical foam block rotor 104 may be formed or arranged around the blades or fins. For example, a traditional blade-based rotor may be covered in a foam or other suitable material to form cylindrical foam block rotor 104, where the traditional rotor provides the structural support and rigidity for the cylindrical foam block rotor 104. While a limited number and arrangement of internal dividers 242 are shown in FIG. 2C, it should be understood that any number, type or arrangement of internal dividers 242 could be used and still fall within the described embodiments. As such, other embodiments are described and claimed.

In various embodiments, cylindrical foam block rotor 104 may include a non-uniform pore density. For example, the one or more dividers 242 may be formed using dense subsections of foam with a much high pores per inch (ppi) than the remaining portions of cylindrical foam block rotor 104. In some embodiments the pore gradient in the radial direction could also be varied. Performance may be improved by using denser foam towards the outer radius of the blower in various embodiments. Other embodiments are described and claimed.

Figure 3:
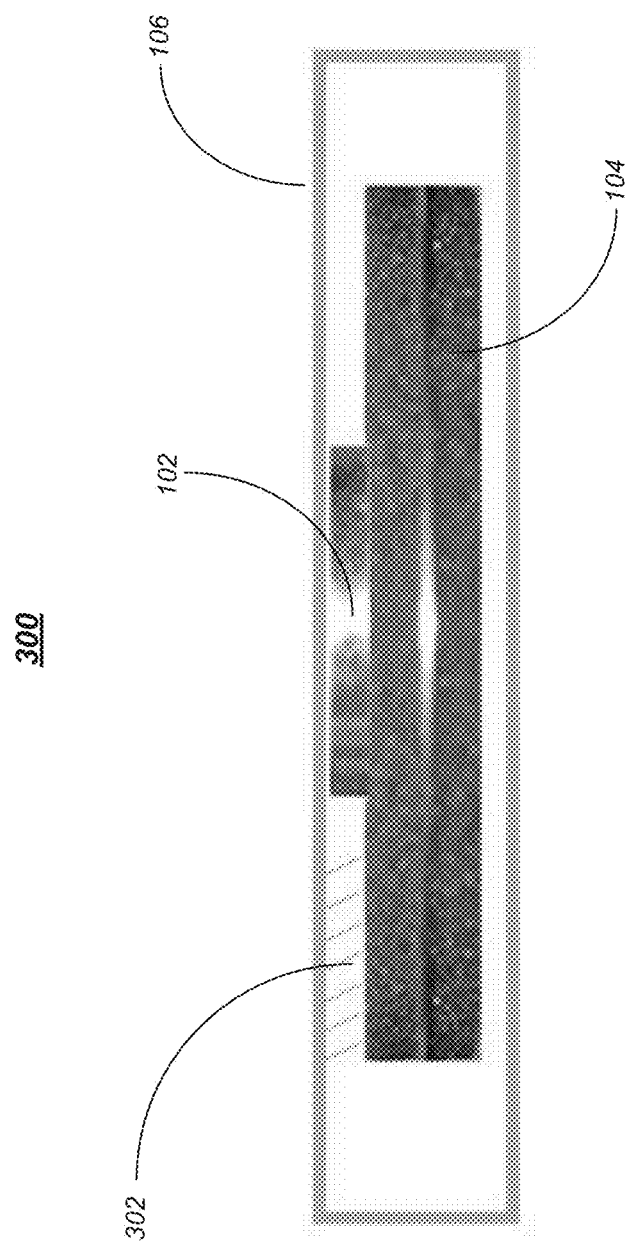
FIG. 3 illustrates one embodiment of a seventh apparatus.

FIG. 3 illustrates an apparatus 300 that may be the same or similar to VRB 100 of FIG. 1A, 120 of FIG. 1B or 140 of FIG. 1C where like elements are similarly numbered. In some embodiments, VRB 300 may include motor and/or hub 102, cylindrical foam block rotor 104, casing 106 and one or more grooves, ribs or brushes 302 arranged as part of a top portion or a bottom portion of casing 106. In various embodiments, VRB 300 may comprise a view from the perspective of the outlet 110. The embodiments are not limited in this respect.

In some embodiments, the one or more grooves, ribs or brushes 302 may be arranged to remove contaminants from the cylindrical foam block rotor 104. For example, dust or other contaminants may collect on the substantially flat surfaces of cylindrical foam block rotor 104. These contaminants may reduce the efficiency of cylindrical foam block rotor 104 and VRB 300 in some embodiments and, therefore, should be removed.

The one or more grooves, ribs or brushes 302 may comprise grooves that are formed as part of a top or bottom portion of the casing 106 in some embodiments. For example, the grooves may be arranged in close proximity to cylindrical foam block rotor 104 when cylindrical foam block rotor 104 is clean (e.g. free of a dust or other contaminant layer). In this manner, as the dust or other contaminants collect on cylindrical foam block rotor 104, the thickness of cylindrical foam block rotor 104 may increase resulting in the dust or other contaminants coming in contact with the grooves 302 that scrape and remove the dust from the cylindrical foam block rotor 104. While described in terms of grooves 302 formed as part of casing 106, it should be understood that any suitable shape, size or arrangement for grooves, ribs or brushes 302 could be used and still fall within the described embodiments. For example, in some embodiments brushes may be affixed inside casing 106 in close proximity to cylindrical foam block rotor 104. Other embodiments are described and claimed.

Figure 4:
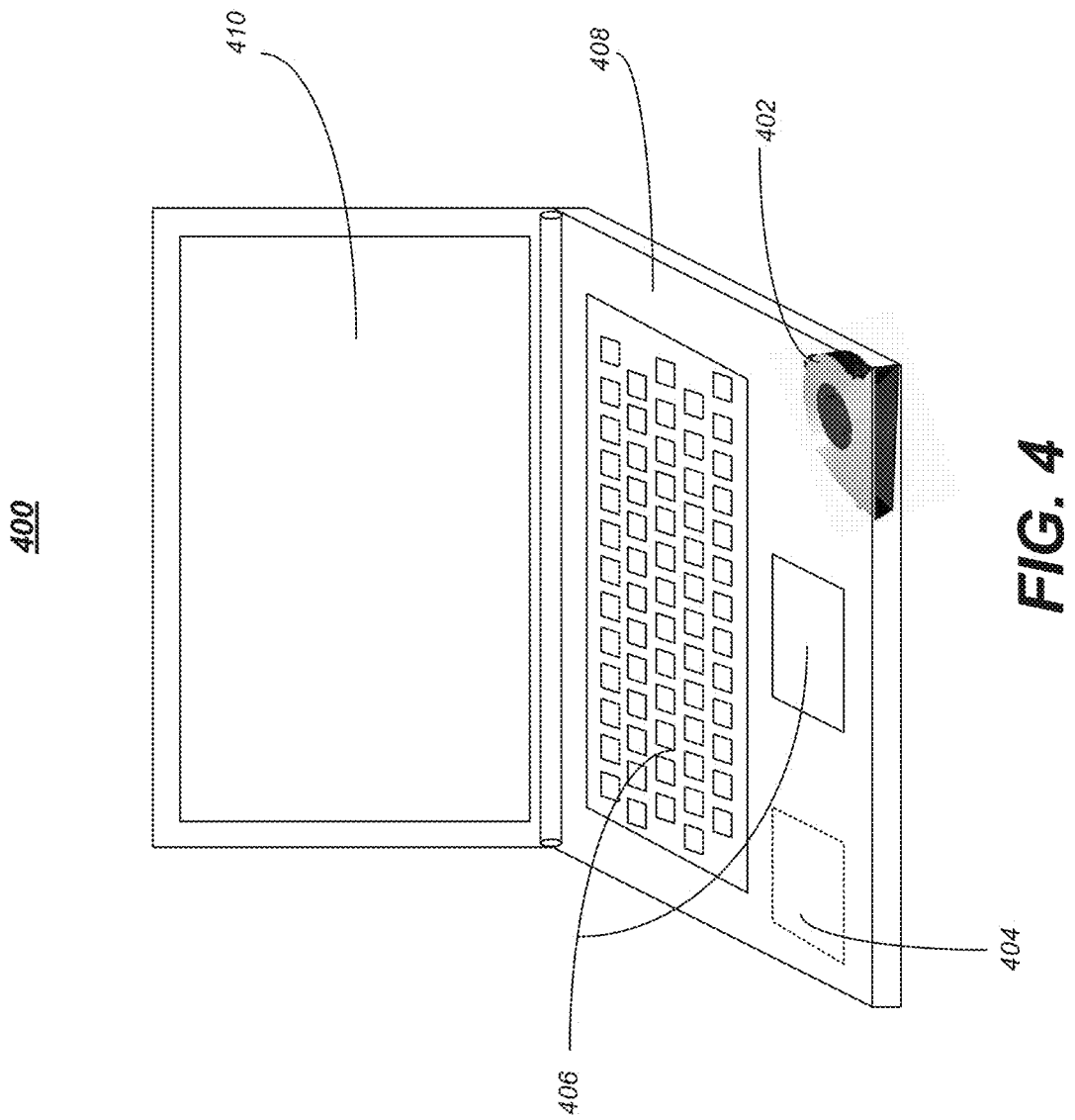
FIG. 4 illustrates one embodiment of a first system.

FIG. 4 illustrations one embodiment of a computing system 400. In various embodiments, computing system 400 may comprise a computing device such as a laptop or notebook computer. As shown in FIG. 4, computing device 400 may include a VRB 402, one or more heat generating components 404, one or more input devices 406, an enclosure 408 and a display 410. While shown in the form of a laptop or notebook computer, it should be understood that the embodiments are not limited in this respect. For example, in some embodiments computing system 400 may comprise a tablet computer, netbook computer, desktop computer, all-in-one (AIO) computer, personal digital assistant (PDA), smartphone, multimedia player or any other suitable device. The computing system 400 is described in more detail with reference to FIG. 6.

While shown and described in conjunction with a computer device in various embodiments, it should be understood that the VRB described herein could be used in any suitable device that requires air to be moved. For example, the VRB described herein may be used in Heating Ventilation and Air Conditioning (HVAC) systems, automotive cooling, desk fans or any other suitable application. Many of these additional usage scenarios include acoustic constraints which may benefit from the implementation of a VRB as described herein. Other embodiments are described and claimed.

In various embodiments, the VRB 402 may be the same or similar to the VRB described above with reference to FIGS. 1A, 1B, 1C and 3. In some embodiments the VRB 402 may include a cylindrical foam block rotor 104 and the VRB 402 may be arranged to remove heat generated inside enclosure 408. For the example, the one or more heat generating components 404 may comprise a processor, memory or other device that generates heat during operation. VRB 402 maybe arranged to remove this heat from system 400 in some embodiments. Other embodiments are described and claimed.

While VRB 402 of FIG. 4 is arranged with its outlet facing in the direction of a user of the system 400, it should be understood that the embodiments are not limited in this respect. For example, VRB 402 may be arranged to provide a rear or side exhaust for the computing system 400. In various embodiments, providing a rear or side exhaust by VRB 402 may avoid a flow of warm air being directed towards a user of the system 400. Additionally, acoustic benefits may be realized through the use of a side or rear exhaust. For example, arranging the outlet of VRB 402 in a direction away from a user of the system 400 may reduce the noise that is audible to the user. Other embodiments are described and claimed.

The above-described embodiments may be used to improve airflow in computing systems. Some embodiments may improve the acoustic performance of computing systems, which may result in an improved user experience. Other embodiments are described and claimed.

Figure 5A:
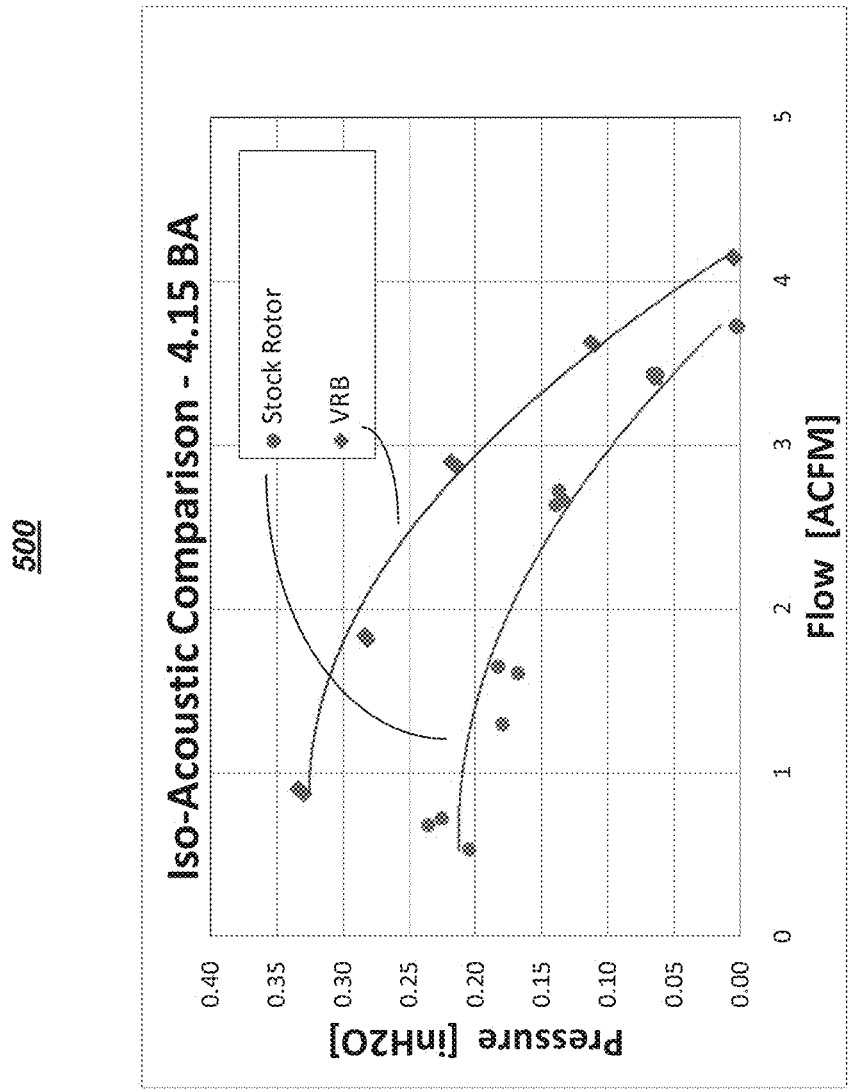
FIG. 5A illustrates one embodiment of a first graph.

In various embodiments, use of any of the above-described VRBs in a computing system may result in enhanced cooling capability at a constant iso-acoustic level compared to traditional cooling methods that rely on blade-based blowers that have discontinuities that generate an undesirable amount of noise during operation. For example, FIG. 5A illustrates an iso-acoustic comparison for a traditional blade-based rotor (e.g. stock rotor) and a VRB, such as any of the above-described embodiments of a VRB. As shown in FIG. 5A, substantial improvements in both pressure and flow can be achieved through the use of a VRB.

In various embodiments, traditional blade-based rotors may generate blade pass tones created as a blade pass an obstruction or other object inside a blower casing. For example, as the blades of a traditional rotor pass by a cut-water in the casing, resulting in a repeating tone that at high speeds sounds to a user like a continuous, annoying hum. This may be undesirable from a design and ergonomic perspective. As a result, some blade-based rotor systems are designed to allow a gap between the rotor and the cut-water, which reduces the efficiency of the blower. In various embodiments, use of a VRB as described herein may allow for the arrangement of the cylindrical foam based rotor 104 in close proximity to the cut-water and other obstructions because the cylindrical foam based rotor 104 does not include blades that would generate blade pass tones. By reducing the space between the cylindrical foam block rotor 104 and the cut-water of the casing, the efficiency of the VRB can be significantly improved.

In various embodiments, the lack of blades on a cylindrical foam block rotor 104 as described herein may allow for higher rotor speeds at the same acoustic noise level of a traditional blade-based rotor. Testing has indicated that as much as a 20%-30% iso-acoustic flow improvement can be achieved using a cylindrical foam block rotor 104 in place of a traditional blade-based rotor.

Figure 5B:
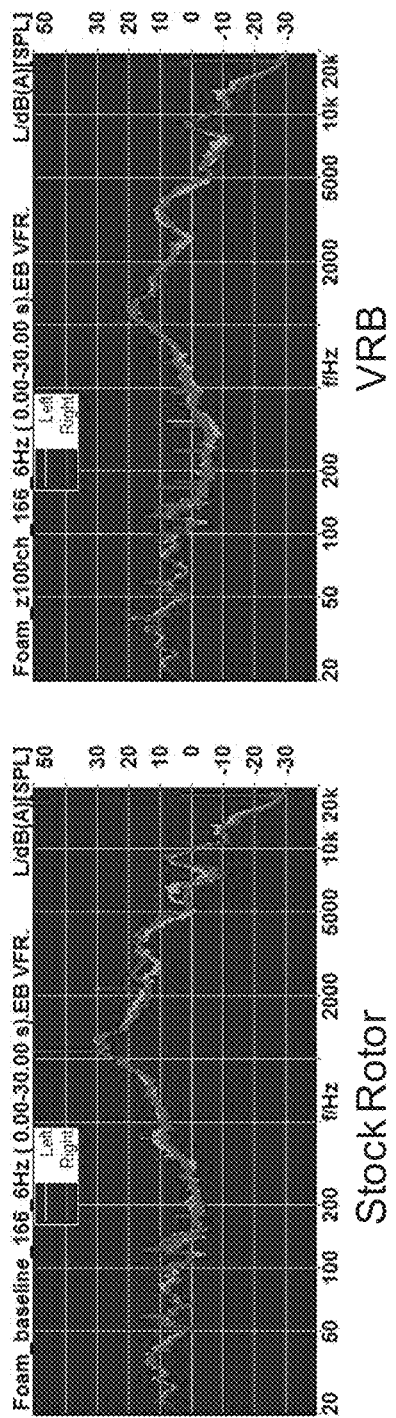
FIG. 5B illustrates one embodiment of a second graph.

FIG. 5B includes two graphs showing the acoustic performance of a stock rotor (e.g. blade-based rotor) and a VRB as described herein. As shown in FIG. 5B, the cylindrical foam block rotor of the VRB may be arranged to generate low iso-acoustic noise or interference compared to a traditional or stock blade-based rotor. For example, the spikes present in the middle-right portion of the stock rotor graph may be caused by blades passing by the cut-water of the casing. This may occur throughout the 500-5000 Hz range that may be particularly sensitive to human hearing. As a result, these acoustic disturbances may be particularly troubling to human users.

The VRB graph shown in FIG. 5B, however, shows fewer spikes and a more uniform spectrum. The spectrum of the VRB would, in some embodiments, be less annoying or bothersome to a user and have an improved sound quality when compared to that of the stock rotor. Because humans are sensitive to tone and to pitch, the improved sound quality of the VRB may result in psychoacoustic benefits not realized by traditional or stock blade-based rotors. Other embodiments are described and claimed.

Figure 6:
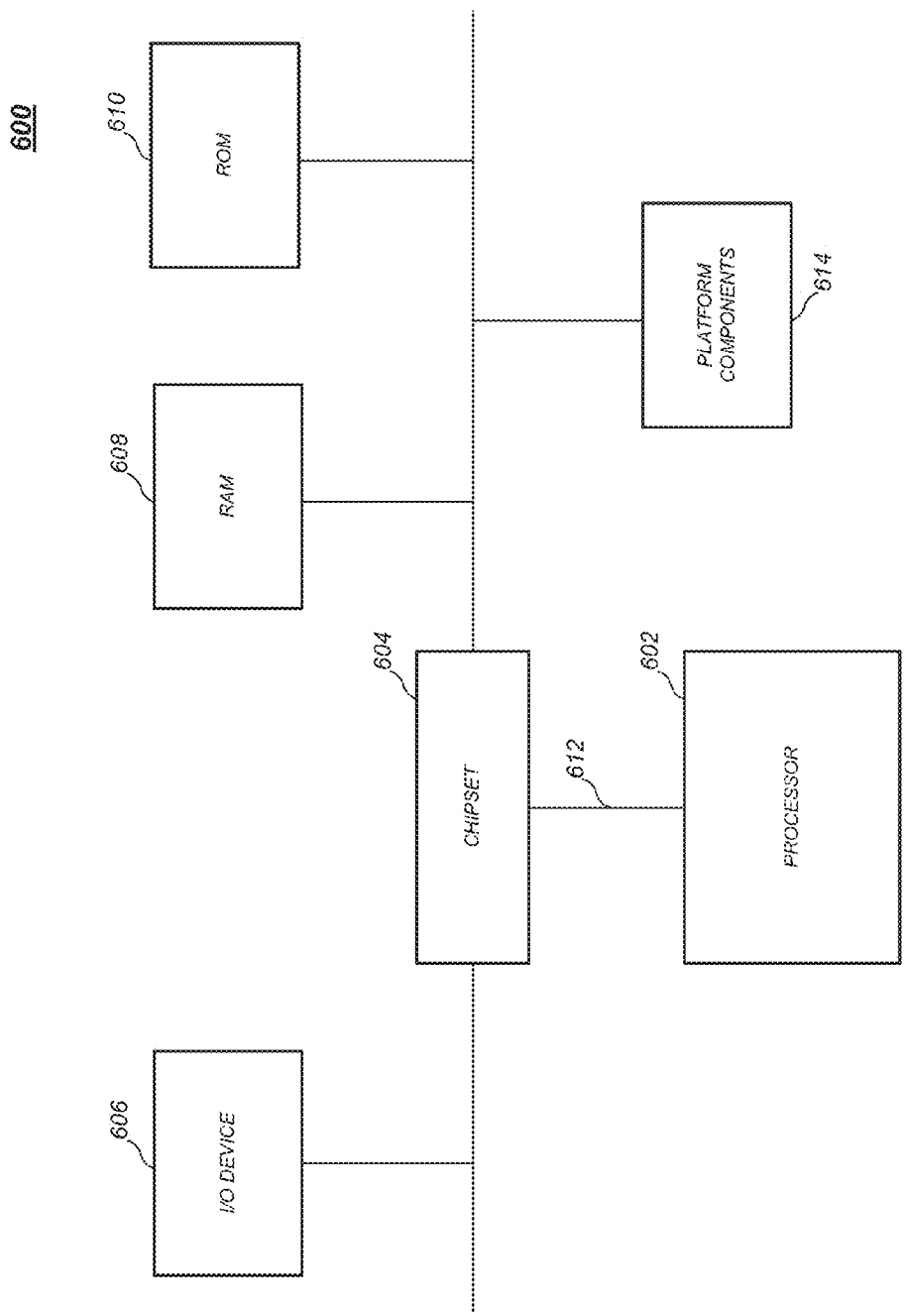
FIG. 6 illustrates one embodiment of a second system.

FIG. 6 is a diagram of an exemplary system embodiment. In particular, FIG. 6 is a diagram showing a system 600, which may include various elements. For instance, FIG. 6 shows that system 600 may include a processor 602, a chipset 604, an input/output (I/O) device 606, a random access memory (RAM) (such as dynamic RAM (DRAM)) 608, and a read only memory (ROM) 610, and various platform components 614 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

In particular, the platform components 614 may include a cooling system implementing various VRB techniques. The cooling system may be sized for the system 600, and may include any cooling elements designed to perform heat dissipation, such as heat pipes, heat links, heat transfers, heat spreaders, vents, fans, blowers, crossflow blowers and liquid-based coolants.

As shown in FIG. 6, I/O device 606, RAM 608, and ROM 610 are coupled to processor 602 by way of chipset 604. Chipset 604 may be coupled to processor 602 by a bus 612. Accordingly, bus 612 may include multiple lines.

Processor 602 may be a central processing unit comprising one or more processor cores and may include any number of processors having any number of processor cores. The processor 602 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 600 may include various interface circuits, such as an Ethernet interface and/or a Universal Serial Bus (USB) interface, and/or the like. In some exemplary embodiments, the I/O device 606 may comprise one or more input devices connected to interface circuits for entering data and commands into the system 600. For example, the input devices may include a keyboard, mouse, touch screen, track pad, track ball, isopoint, a voice recognition system, and/or the like. Similarly, the I/O device 606 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 600 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A blower, comprising
a motor;
a hub operably coupled to the motor;
a cylindrical rotor operably coupled to the hub, the cylindrical rotor comprising:
  a cylindrical foam block formed of a first porous material that is porous to air, wherein the first porous material has a first pores per inch characteristic; and
  a plurality of internal dividers extending across the cylindrical foam block to form a plurality of chambers in the cylindrical rotor, wherein the plurality of internal dividers is formed of a second porous material that is porous to air, wherein the second porous material has a second pores per inch characteristic, the first pores per inch characteristic different from the second pores per inch characteristic; and
a casing having one or more inlets and one or more outlets.

2. The blower of claim 1, wherein the one or more inlets are arranged in an axial direction of the cylindrical rotor and the one or more outlets arranged in a radial direction of the cylindrical rotor.

3. The blower of claim 1, wherein the cylindrical rotor is arranged to create a volumetric resistance inside the casing, the volumetric resistance to cause a flow of air to be drawn into the one or more inlets and out of the one or more outlets.

4. The blower of claim 1, wherein the cylindrical rotor is arranged to generate a centrifugal force to cause a flow of air to flow through the cylindrical foam material or one or more cylindrical foam blocks.

5. The blower of claim 1, wherein the cylindrical rotor comprises a substantially flat top surface, a substantially flat bottom surface and a substantially contiguous radial surface.

6. The blower of claim 1, wherein the cylindrical rotor comprises a material having between 10 pores per inch (ppi) and 100 ppi.

7. The blower of claim 1, wherein the one or more internal dividers are arranged to prevent azimuthal circulation inside the plurality of chambers.

8. The blower of claim 1, comprising:
one or more grooves, ribs or brushes arranged as part of a top portion or a bottom portion of the casing.

9. The blower of claim 8, wherein the one or more grooves, ribs or brushes is arranged to remove contaminants from the cylindrical rotor.

10. The blower of claim 1, wherein the cylindrical rotor is arranged to generate low iso-acoustic interference compared to a blade-based rotor.

11. A computing system, comprising
an enclosure;
one or more heat generating components; and
a blower arranged inside the enclosure, the blower comprising:
a cylindrical rotor having an inner radial edge, the cylindrical rotor comprising:
a cylindrical foam block formed of a first porous material that is porous to air, wherein the first porous material has a first pores per inch characteristic; and
a plurality of internal dividers extending across the cylindrical foam block to form a plurality of chambers in the cylindrical rotor,
wherein the plurality of internal dividers is formed of a second porous material that is porous to air, wherein the second porous material has a second pores per inch characteristic, the first pores per inch characteristic different from the second pores per inch characteristic.

12. The computing system of claim 11, wherein the blower comprises:
a motor;
a hub arranged to support the cylindrical rotor and to couple the cylindrical rotor to the motor; and
a casing having one or more inlets arranged in an axial direction of the cylindrical rotor and one or more outlets arranged in a radial direction of the cylindrical rotor.

13. The computing system of claim 12, wherein the cylindrical rotor is arranged to create a volumetric resistance inside the casing, the volumetric resistance to cause a flow of air to be drawn into the one or more inlets and out of the one or more outlets.

14. The computing system of claim 12, comprising:
one or more grooves, ribs or brushes arranged as part of a top portion or a bottom portion of the casing.

15. The computing system of claim 14, wherein the one or more grooves, ribs or brushes are arranged to remove contaminants from the cylindrical rotor.

16. The computing system of claim 11, wherein the cylindrical rotor is arranged to generate a centrifugal force to cause a flow of air to flow through the cylindrical rotor.

17. The computing system of claim 11, wherein the cylindrical rotor comprises a substantially flat top surface, a substantially flat bottom surface and a substantially contiguous radial surface.

18. The computing system of claim 11, wherein the cylindrical rotor comprises a material having between 10 pores per inch (ppi) and 100 ppi.

19. The computing system of claim 11, wherein the one or more internal dividers are arranged to prevent azimuthal circulation inside the plurality of chambers.

20. The computing system of claim 11, wherein the cylindrical rotor is arranged to generate low iso-acoustic interference for the computing system compared to a blade-based rotor.

21. The blower of claim 1, wherein the cylindrical rotor comprises an inner radial edge and an outer radial edge, wherein the one or more internal dividers substantially extend from the inner radial edge to the outer radial edge.

* * * * *